United States Patent [19]

Harry

[11] Patent Number: 5,620,225

[45] Date of Patent: Apr. 15, 1997

[54] DEVICE FOR THE REMOVABLE FASTENING TO A FLOOR OF THE UNDERFRAME OF A SEAT AND ITS APPLICATION ESPECIALLY TO LAND-BASED MOTOR VEHICLES

[75] Inventor: Sylvain Harry, Noyers, France

[73] Assignee: Cesa-Compagnie Europeenne de Sieges pour Automobiles, Levallois-Perret Cedex, France

[21] Appl. No.: 558,883

[22] Filed: Nov. 16, 1995

[30] Foreign Application Priority Data

Dec. 15, 1994 [FR] France .................................. 94 15133

[51] Int. Cl.$^6$ ........................................................ B60N 2/00
[52] U.S. Cl. ................................ 296/63; 70/261; 411/348
[58] Field of Search .............................. 296/63, 64, 65.1, 296/68.1, 69; 70/261; 297/378.14; 411/21, 348

[56] References Cited

U.S. PATENT DOCUMENTS

| | | | |
|---|---|---|---|
| 4,114,947 | 9/1978 | Nelson | 297/344.1 |
| 4,512,597 | 4/1985 | Nabb et al. | 292/143 |
| 4,850,774 | 7/1989 | Weaver et al. | 411/298 |

FOREIGN PATENT DOCUMENTS

| | | |
|---|---|---|
| 1181112 | 1/1985 | Canada . |
| 605270 | 7/1994 | European Pat. Off. . |
| 2689739 | 10/1993 | France . |
| 2705289 | 11/1994 | France . |
| 2272251 | 5/1994 | United Kingdom . |

*Primary Examiner*—Andrew C. Pike
*Attorney, Agent, or Firm*—Sughrue, Mion, Zinn, Macpeak & Seas

[57] ABSTRACT

The expanding ball-type locking pin device (30, 31, 33) is equipped with a control (40) which comprises a lever (42) which exhibits an operating hand grip (421) and an articulation (422) associated with a casing (20) to allow it to turn about an axis parallel to a given direction (Δ) between an unlocked position and a locked position and which bears a link so as to be able to move the needle (33) between its two positions, and furthermore comprises a safety feature (51, 52, 53, 54) coupled to the lever (42) and intended to interact with an underframe (P) to prevent a seat from being tipped into the opened-out position as long as a lock bolt (30) is not locked onto a striker plate.

10 Claims, 4 Drawing Sheets

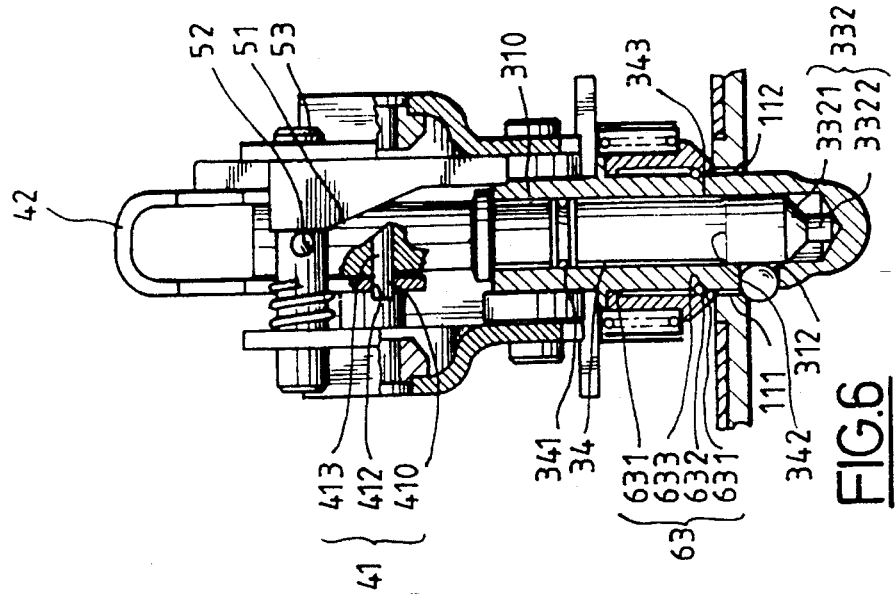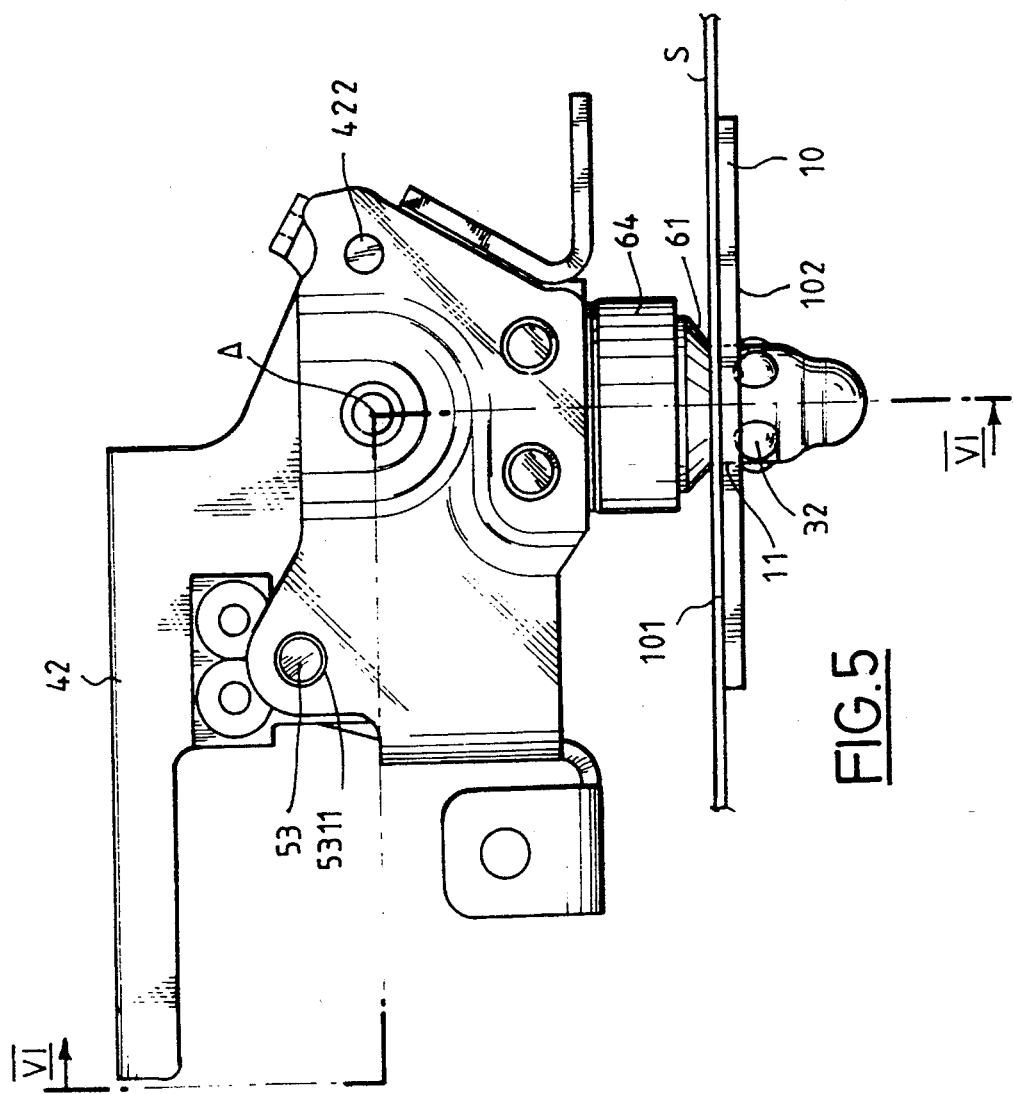

DEVICE FOR THE REMOVABLE FASTENING TO A FLOOR OF THE UNDERFRAME OF A SEAT AND ITS APPLICATION ESPECIALLY TO LAND-BASED MOTOR VEHICLES

BACKGROUND OF THE INVENTION

The present invention relates to fastening or anchoring devices for holding an object on a surface in a removable and secure manner, for example such as a land-based vehicle seat on the floor or floorpan of this vehicle.

In many technical fields it is necessary to join together two objects or parts of an object so as to keep them assembled in a failproof manner.

Such is the case for example in the aeronautical sector for jettisonable containers. Canadian patent No. 1,181,112 describes a programmed delayed-opening expanding ball-type locking pin fastening device.

Such is also the case for example in the automotive sector for so-called "single-volume people-carrier" land-based motor vehicles which derive both from the saloon-type vehicle known as an estate car and from the utility vehicle known as a small van. Given the universal nature of the use envisaged for these vehicles, it is necessary to equip them with seats at least some of which are removable and capable of adopting multiple and varied, preferably predetermined, positions, that is to say capable of adopting a certain number of discrete positions, each position being clearly defined.

Seats of this type must, for example, so that they can be occupied, be capable of opening out completely into a bunk, a relaxing armchair, or a lounger, into a normal so-called driving or travelling seat, or of opening out partially into panels. They must also be capable of retracting so as to fold partially or fold up completely in a compact and relatively unbulky manner with a view to retracting them into the vehicle or removing them therefrom; they cannot then be occupied. French Patent Nos. 2,689,739 and 2,705,289 describe seats of this type.

For such seats it is therefore necessary to have a device for anchoring and locking them to the floor of the vehicle which is easy to manipulate and which is such that a seat fitted onto the floor can in fact be occupied only when the device is not only anchored and locked but also actually disabled so that this locking cannot come undone.

Indeed, for reasons of safety, especially in the event of violent impacts with a high longitudinal component, referenced with respect to the vehicle, the seat must not be allowed to give way under its occupant, or even be carried along by the latter in the event that the seat belt with which the seat is equipped no longer is anchored directly to two or three points on the structure or bodyshell of the vehicle, but in contrast when this seat belt forms part of the seat and is somewhat "on board" the latter, the various anchoring points of the seat belt being established directly on the seat itself. It will be understood that the forces to be absorbed and/or transmitted in the event of an impact are localized essentially in the area of the underframe of the seat and of the floor of the vehicle, as well as where they join.

All the difficulties that there are in satisfying all these requirements, which are often contradictory, particularly when it is recalled that such a device has to be mass-produced at minimum cost in a particularly reliable manner, will thus be grasped.

SUMMARY OF THE INVENTION

The object of the invention is to produce a fastening device of the retractable expanding-ball locking pin type which is suitable for all cases in which it is necessary to lock and unlock two parts one with respect to the other quickly under conditions of optimum safety.

The device according to the invention, which is suitable especially for immobilizing a vehicle seat on the floor of this vehicle, displays the particular features of:

speed of locking and of unlocking, manual snap-fitting and unlocking through action on a control, having safety indicators to indicate poor snap-fitting and/or anchorage to the floor, preventing use of the seat, and as well as protecting its essential constituent parts especially against impact and dirt.

The subject of the invention is a device for the removable fastening, to a floor, of the underframe of a multiple-configuration seat with an opened-out position in which it can be occupied, and a closed up position in which it cannot be occupied, and where the seat is moved from one of these positions to the other by tipping it in a given direction. This device consists especially on the one hand of a striker plate which is associated with the floor and which exhibits two opposed faces, for bearing and for locking, pierced through by an opening with a free passage bordered by a contact area on the locking face, and, on the other hand, of a casing which carries a lock bolt made of a hollow long straight locking body with a cylindrical guide cavity, the axis of which is orthogonal to this given direction and with a tip, and with at least one passage pierced through the body to emerge in the cavity and with an open end, of at least one ball housed in the passage so as to be retained therein so that it can move between a first position projecting partially outside the body so as to be able to encounter the contact area to lock the lock bolt onto the striker plate when its tip is engaged in the passage, and a second position retracted inside the body so as to separate itself from the contact area so as to unlock the lock bolt from the striker plate, of a needle housed so that it can move in the cavity between an active position in which it makes the ball project and an inactive position in which it allows the ball to retract, and with a cylindrical shank, with an inside end portion consisting of a cone frustum converging towards a pilot to cause the ball to move from one of its positions to the other and with an outside end portion, and of a control borne by the casing and connected by a link to this outside end portion so as to move the needle in the body. This device is noteworthy in that the control comprises a lever which exhibits an operating hand grip and an articulation associated with the casing to allow it to turn about an axis parallel to the given direction between an unlocked position and a locked position and which bears the link so as to be able to move the needle between its two positions, and is noteworthy in that it comprises a safety feature coupled to the lever and intended to interact with the underframe to prevent the seat from being tipped into the opened-out position as long as the lock bolt is not locked onto the striker plate.

Another subject of the invention is the application of a device of the type indicated before to a land-based motor vehicle seat, for removably mounting it on the floor of this vehicle.

Other features of the invention will emerge from reading the description and claims which follow as well as from examining the appended drawing, given merely by way of example, in which:

BRIEF DESCRIPTION OF THE DRAWINGS

FIGS. 5 and 6 are views similar to those of FIG. 3 and 4 in which the device according to the invention is in the locked position, anchorage having been achieved.

DESCRIPTION OF A PREFERRED EMBODIMENT

Since retractable expanding ball-type locking pin removable fastening devices and land-based motor vehicle seats are well known in the art, the following description will deal only with that to which the invention relates directly or indirectly. For the rest, the person skilled in the art of the technical sector in question will draw into the common conventional solutions at his disposal in order to face up to the specific problems with which he is confronted. In particular, reference may usefully be made to the prior art documents cited earlier.

In that which follows, the same reference number will always be used to identify an analogous element.

For the convenience of the explanation, each of the constituent parts of a device according to the invention will be described in turn in its particular application to a land-based motor vehicle seat, before the operation and, if need be, manufacture thereof is explained.

In that which follows, the device according to the invention is described with regard to its specific application to a multiple-configuration land-based motor vehicle seat with an opened-out position in which it can be occupied and with a closed-up position in which it cannot be occupied, and in which it is moved from one of these two positions to the other by tipping it in a given direction. It is obvious that the invention is not limited to this particular application.

Figures 1, 2:
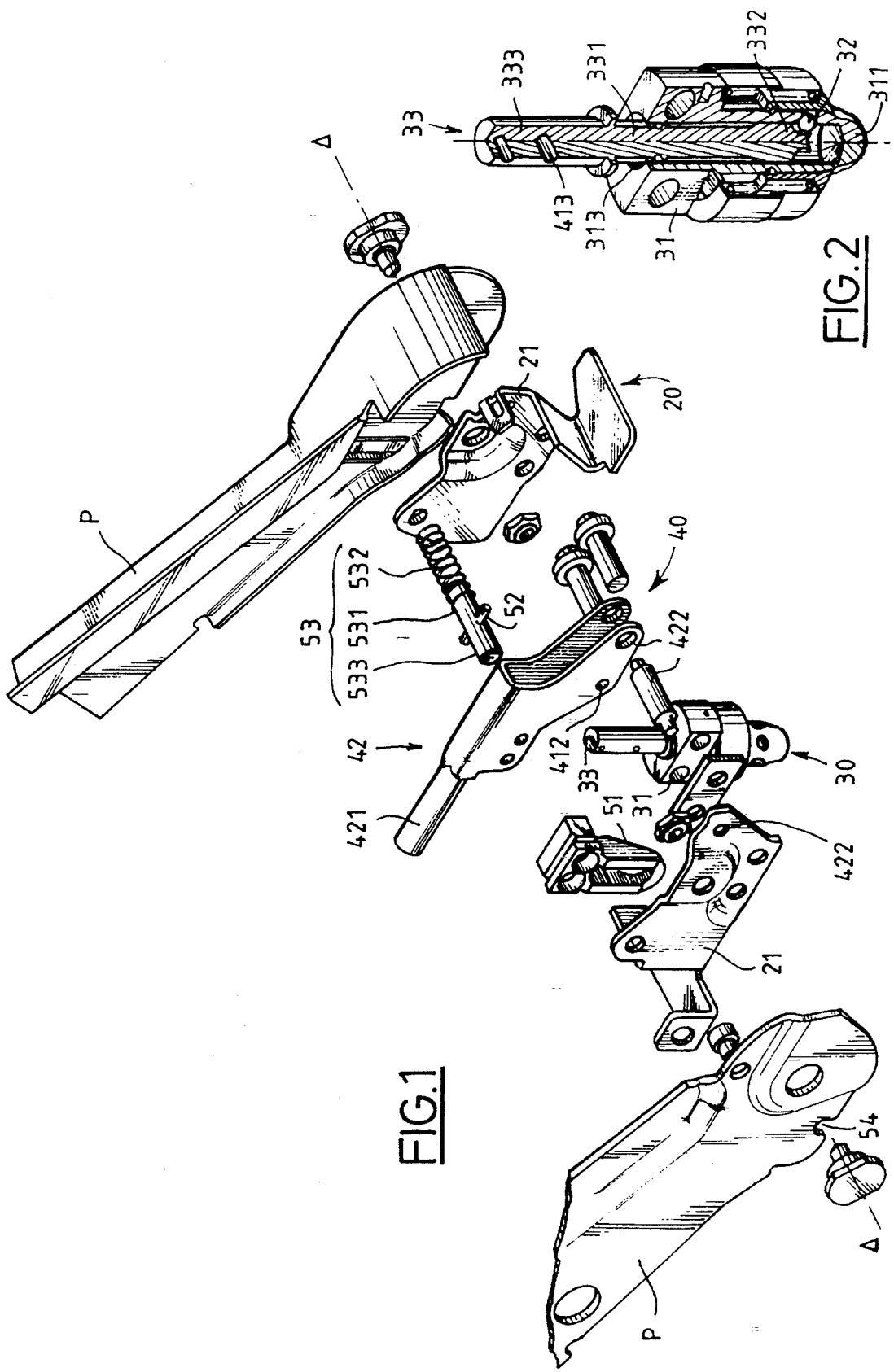
FIG. 1, is an exploded diagrammatic perspective representation of one embodiment of the invention in its application to a land-based motor vehicle seat.
FIG. 2 is a diagrammatic perspective representation, with local sections, of an assembled part of this embodiment.

Such a seat comprises an underframe P with at least one leg designed to rest directly or indirectly on a floorpan S or floor to which it is to be fastened removably (see FIGS. 1 and 5). Such a seat usually rests on the floor with the aid of an underframe equipped with an articulated joint which allows tipping in a given direction Δ about the axis (see FIG. 1), usually transverse to the conventional longitudinal axis of a vehicle. Such an articulated joint is obtained in any conventional manner, for example using pivots and bearings or the like.

Figure 3:
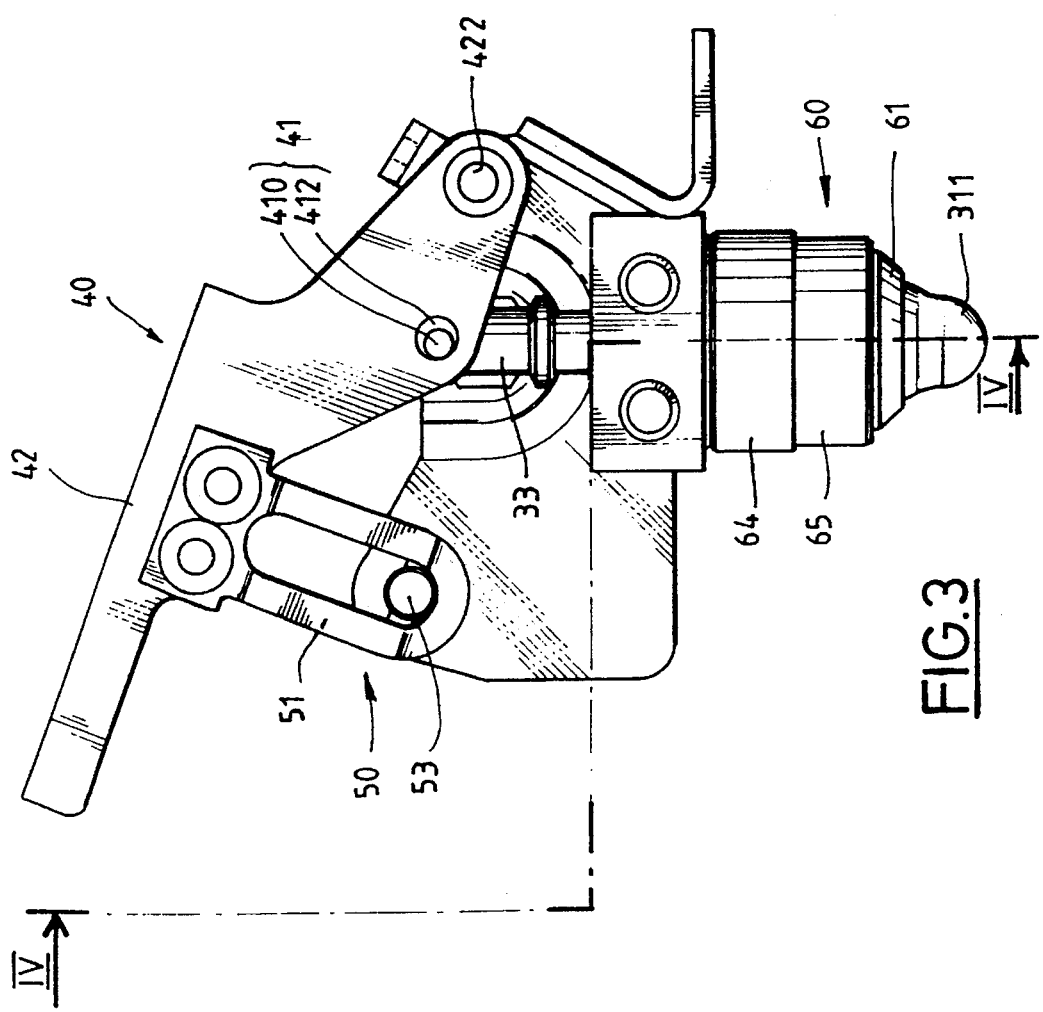

As can be seen, a retractable expanding ball-type locking pin device according to the invention essentially comprises a striker plate 10 (see FIG. 5), a casing 20, a lock bolt 30, a control 40 (see FIG. 1), a safety feature 50, and, for preference, a protector 60 (see FIG. 3).

The striker plate 10, made for example of a small plate of appropriate metal sheet, is intended to be fastened to the floor S of a vehicle especially between two partitions thereof. The striker plate 10 comprises two opposite faces, a bearing face 101 and a locking face 102 (see FIG. 5). The striker plate 10 is pierced right through from one of the faces to the other by an opening 11 with a free passage 111 and a contact area 112 (see FIGS. 5 and 6), for example set back for reasons which will be understood later. This contact area 112 is in the form, for example, of a depression or an annular chamfer or the like.

The casing 20 which is, for example, intended to be associated and to interact with the underframe P to define the tipping axis Δ with the aid of the articulated joint, bears the rest of the device according to the invention. The casing 20 consists for example of two lateral cheeks 21 which are practically symmetric with respect to a plane perpendicular to the direction Δ (see FIG. 1).

The lock bolt 30 essentially comprises a body 31, at least one ball 32, a needle 33, and means 34 for guiding the needle in the body (see FIGS. 1, 2, and 6).

The body 31 is hollow, long and straight, and exhibits a guide cavity 310, for example cylindrical, a tip 311, preferably closed, and an open end 313. The body 31 is provided with at least one passage 312 pierced right through it to emerge in the cavity 310. For preference, at least three identical equidistant passages are used.

At least one ball 32 is housed in each passage 312 to be retained therein so that it can move between a first position to project partially outside the body so as to be able to encounter the contact area 112 so as to lock the lock bolt 30 onto the striker plate 10, and a second position retracted inside the body so as to be able to separate itself from the contact area 112 so as to unlock the lock bolt 30 from the striker plate 10. The balls are held in the passages for example by crimping or a similar technique.

The needle 33 is housed so that it can move in translation in the cavity 310 between an active position in which it can make the balls project in their first position and hold them in this position, and an inactive position in which the balls can adopt their second, retracted, position. The needle 33 comprises a shank 331, for example, a cylindrical one, an inside end portion 332 consisting of a cone frustum 3321 converging towards a pilot 3322 and also an outside end portion 333, whose role will become clear later (see FIG. 2).

The guide means 34, of any appropriate type, which allow easy and practically play-free sliding of the needle within the cavity of the body, comprise for example shoulders 342 on the shank of the needle, each of which interacts with a corresponding bearing surface 343 of the cavity. For preference, a seal 341, for example an O-ring, provides sealing (see FIG. 6).

The control 40 is borne by the casing 20 and is connected by a link 41 to the outside end portion 333 of the needle 33 so as to move the needle 33 at will within the body 31 (see FIGS. 2 and 3).

The control 40 is in the form of a lever 42 which is equipped with an operating hand grip 421 and with an articulation 422 associated with the casing 20 to allow it to turn (see FIG. 1), describing an arc of a circle centered on an axis parallel to the given direction Δ, between an unlocked position and a locked position and which bears the link 41 so as to be able to move the needle 33 between its two corresponding positions.

The link 41 preferably has play. The link 41 for example comprises a pin 410 borne by the outside end portion 333 of the needle 33 in which it is engaged through a transverse hole 413, and at least one hole 412 made in the lever so as to be able to move therein for example with play (see FIGS. 2 and 3). The play may, without preference, be in either the lever or the needle or both, for reasons of kinematics, since the needle moves with a translational movement, and the lever moves along an arc of a circle.

The articulation 422 of the lever 42 on the cheeks 21 of the casing 20, which allows it to move about an axis parallel to the given direction Δ, is obtained in any appropriate conventional manner, for example with the aid of pivots and bearings (see FIG. 1).

The safety feature 50 is coupled to the lever 42 and interacts with the underframe P to prevent the seat from being tipped into the opened-out position as long as the lock bolt is not locked on the striker plate. The safety feature 50 essentially comprises (see FIGS. 5 and 6) a cam 51 borne by the lever 42, a cam follower 52 interacting with the cam 51 and mounted on the casing 20 so as to be able to move parallel to the given direction Δ, a moving stop piece 53 associated with the cam follower 52, whose movements it follows integrally so as to move between an inoperative set-back position and an operative projecting position, and a stop feature 54 (see FIG. 7) borne by the underframe and capable of encountering the stop piece in the operative projecting position.

The cam 51 is in the form of a single or multiple slope, the active surface of which is directed in the given direction Δ. The cam follower 52 is for example in the form of a rod which is mounted transversely, orthogonal to the given direction Δ, as will be understood later. The stop piece 53 comprises (see FIGS. 4 and 5) a finger 531 mounted so that it can slide parallel to the given direction Δ in the casing 20 for example with the aid of housings 5311 formed in each of the cheeks 21 of the casing 20, an elastic urging means 532 such as a coil spring with helical turns operating in compression, for example, and acting on the finger 531 to keep cam 51 and cam follower 52 in contact and to tend to place the stop piece 53 in the operative projecting position, and an extension 533 capable of placing itself in the path described by the stop feature 54 when the underframe P moves from one of its two positions to the other, to impede it and prevent it from being tipped into the opened-out position when the lock bolt is not locked onto the striker plate.

The protector 60 essentially comprises (see FIGS. 3 and 4) a sleeve tube 61 mounted so that it can slide on the outside of the body 31 of the lock bolt 30, a spring 62, and a travel limiting device 63 defining the amplitude of the excursion of the sleeve tube 61 relative to the body 31. This travel limiting device 63 is made for example (see FIG. 6) of shoulders 631 inside the sleeve tube 61 and of an elastic snap ring 632 such as a circlip engaged in a peripheral groove 633 of the body 31 of the lock bolt 30. The protector also comprises (see FIG. 4) a spring cover 64 with a rim 641 and a cap 65 with a rim 651. The spring 62 bears against each of the rims of the spring cover and of the cap, which elements can slide one inside the other so as to push the sleeve tube back into a position in which it normally covers over the passages and thus prevents the balls from occupying their first, projecting, position.

All the component parts of a device according to the invention are made from conventional materials, preferably metal ones, which are shaped and worked using traditional techniques.

All the constituent parts of a device according to the invention are joined together, mounted, and assembled as emerges clearly from examining the figures of the drawing.

The operation of this embodiment of the device according to the invention will now be described.

It will be assumed that initially the seat occupies a closed-up position in which it cannot be occupied, and is separated from the floors. This situation is the one illustrated in FIGS. 3, 4, and 7. In such a situation the device is in the unlocked position. It can therefore be seen that the protector 60 prevents the balls 32 from projecting and that in this condition the needle 33 is in the inactive position and cannot move therefrom because the balls are resting against the pilot 3322 and the cone of the needle and thus immobilize the latter and the control lever 42 associated with it by the link 41. In such a situation the safety feature 50 prevents the seat from being tipped into the opened-out position. What happens is that the extension 533 of the finger of the stop piece 53 is in the operative projecting position and is placed in the path described by the stop feature 54 of the underframe because the cam follower 52 is pressed against the bottom part of the slope of the cam 51.

If now it is desired to anchor the underframe P of the seat to the floor, all that is required is to engage the tip 311 of the body of the lock bolt in the passage 111 of the opening of the striker plate 10. By doing this, the sleeve tube 61 of the protector encounters the bearing face of the striker plate 10 and this bearing face pushes the sleeve tube 61 back against the elastic urging of its spring 62. In that way, the sleeve tube 61 uncovers the passages 315 which now face the contact area of the locking face 102 of the striker plate 10. There is no longer anything to prevent the balls 32 from coming into their first position projecting partly outside the body 31. To cause the balls 32 to project, all that is required is to act on the hand grip 421 of the lever of the control 40 so that this drives the needles 33, and the cone frustum 3321 of the inside end portion of which drives the balls 32 from their retracted position into their projecting position. By doing this, the lock bolt 30 is locked onto the striker plate 10. During this operation the cam 51, driven by the lever 42 as it pivots, pushes the cam follower 52 back against the elastic urging. This has the effect of placing the extension 533 of the stop piece 53 in its inoperative set-back position, in which it ceases to intercept the path described by the stop feature 54 of the underframe. There is then nothing to prevent the seat from being tipped into its opened-out position in which it can be occupied. The device now occupies the position in which it is illustrated in FIGS. 5 and 6.

Figure 4:
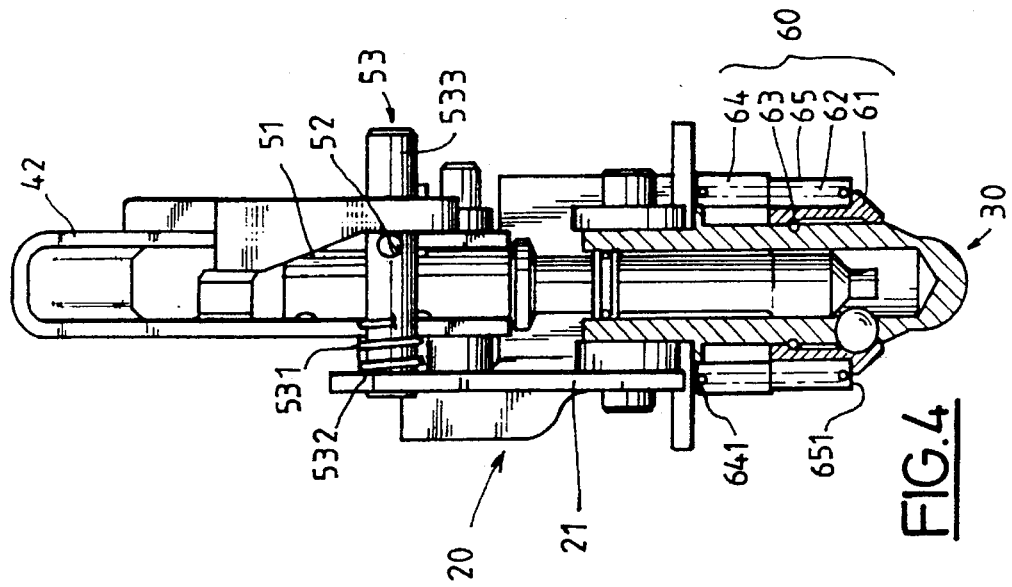
FIGS. 3 and 4 are respectively a view in elevation and a front-on view partly sectioned on IV—IV of the device according to the invention, of FIG. 1, in the unlocked position before anchorage.
Figure 7:
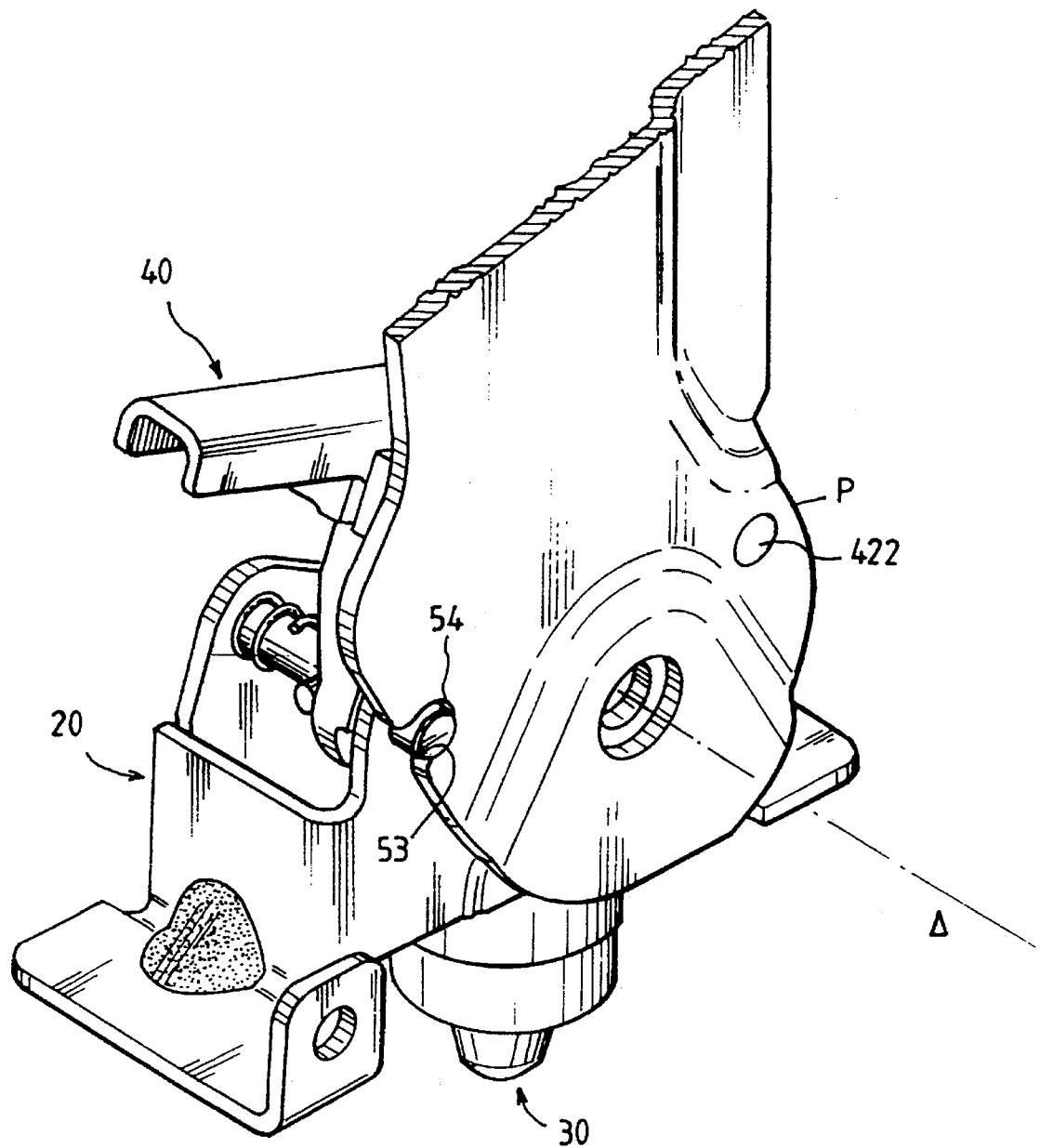
FIG. 7 is a perspective part view illustrating the device according to the invention in a position which corresponds to the one in which it is represented in FIGS. 3 and 4.

If it is now desired to bring the seat back into its closed-up position in order to save space or remove it from the vehicle, all that is required for example is to start by tipping it, then to act on the handgrip 421 of the lever of the control to move this handgrip from the position in which it is illustrated in FIGS. 5 and 6 to the one in which it is illustrated in FIGS. 3, 4, and 7.

The foregoing clearly demonstrates the distinctive particular features of the invention, the benefit which it has to offer, and the advantages which it affords.

I claim:

1. A device for removable fastening, to a floor, of an underframe (P) of a seat, said underframe being movable between first and second positions by tipping it upon a given direction (Δ), said device comprising:

a striker plate (10) which is associated with the floor (S) and which exhibits two opposed faces (101,102), for bearing and for locking, pierced through by an opening (11) with a free passage (111) bordered by a contact area (112) on the locking face (102);

a casing (20) which includes a lock bolt (30) comprising a hollow long straight locking body (31) with a cylindrical guide cavity (310), which has an axis orthogonal to said direction (Δ), and with a tip (311), and with at least one passage (312) pierced through said body (31) to emerge into the cavity (310), and with an open end (313), said lock bolt (30) further comprising at least one ball (32) housed in said at least one passage (312) so as to be retained therein so that it can move between a first position projecting partially outside the body (31) so as to be able to encounter the contact area (112) to lock the lock bolt (30) onto the striker plate (10) when the tip (311) thereof is engaged in the free passage (111), and a second position retracted inside the body (31) so as to separate itself from the contact area (112) so as to unlock the lock bolt (30) from the striker plate (10), said lock bolt (30) further comprising a needle (33), housed so that it can move in the cavity (310) between an active position in which it allows said at least one ball (32) to project and an inactive position in which it allows the ball (32) to retract, with a cylindrical shank (331), with an inside end potion (332) consisting of a cone frustum (3321) converging towards a pilot (3322) to cause the ball (32) to project or retract, and with an outside end portion (333):

a control (40) borne by the casing (20) and connected by a link (41) to said outside end portion (333) so as to move the needle (33) in the body (31), wherein the control (40) comprises a lever (42) which has an operating hand grip (421) and an articulation (422) associated with the casing (20) to allow it to turn about an axis parallel to the given direction (Δ) between an unlocked position and a locked position and which bears the link (41) so as to be able to move the needle (33) between the two positions thereof; and a safety feature (50) coupled to the lever (42) and intended to interact with the underframe (P) to prevent said underframe from being tipped into the first position thereof as long as the lock bolt (30) is not locked onto the striker plate (10).

2. The device according to claim 1, wherein the safety feature (50) comprises a cam (51) borne by the lever (42), a cam follower (52) interacting with the cam (51) and mounted on the casing (20) so as to be able to move parallel to the given direction (Δ), a moving stop piece (53) associated with the cam follower (52), whose movements it follows integrally so as to move between an inoperative set-back position and an operative projecting position, and a stop feature (54) which is borne by the underframe (P) and which when the underframe is in the second position thereof cooperates with the stop piece (53) in the operative projecting position.

3. The device according to claim 2, wherein the cam (51) is a slope and the cam follower (52) is a rod.

4. The device according to claim 3, wherein the stop piece (53) comprises a finger (531) mounted so that it can slide parallel to the given direction (Δ) in the casing (20), an elastic urging means (532) acting on the finger (531) for keeping the cam (51) and the cam follower (52) in contact, and an extension (533) which when the lock bolt (30) is not locked onto the striker plate (10) cooperates with the stop feature (54) in order to impede and prevent the underframe (P) from being tipped into the first position thererof, and wherein the cam follower (52) is mounted transversely on the finger (531), orthogonal to the given direction (Δ).

5. The device according to claim 2, wherein the stop piece (53) comprises a finger (531) mounted so that it can slide parallel to the given direction (Δ) in the casing (20), an elastic urging means (532) acting on the finger (531) for keeping the cam (51) and the cam follower (52) in contact, and an extension (533) which when the lock bolt (30) is not locked onto the striker plate (10) cooperates with the stop feature (54) in order to impede and prevent the underframe (P) from being tipped into the first position thererof.

6. The device according to claim 1, wherein the link (41) has play.

7. The device according to claim 1, wherein the link (41) comprises a pin (410) borne by the outside end position (333) of the needle (33) and engaged in the lever (42).

8. The device according to claim 1, further comprising a protector (60) normally urged elastically to a position in which it closes off said at least one passage (312) in the body (31) of the lock bolt (30) to prevent said at least one ball (32) from projecting into the first position thereof and to prevent the needle (33) from adopting the active position thereof.

9. The device according to claim 8, wherein the protector (60) comprises a sleeve tube (61) mounted so that it can slide on an outside of the body (31), a spring (62) urging the sleeve tube (61), and a travel limiting device (63).

10. The device according to claim 9, wherein the protector (60) further comprises a spring cover (64) and a cap (65), the spring (62) being engaged between said spring cover (64) and said cap (65).

* * * * *